US008803733B2

(12) United States Patent
Kolak et al.

(10) Patent No.: US 8,803,733 B2
(45) Date of Patent: Aug. 12, 2014

(54) TERMINAL AXIAL RATIO OPTIMIZATION

(75) Inventors: Frank Kolak, Groton, MA (US); Aleksandra Markina-Khusid, Chelmsford, MA (US)

(73) Assignee: Mitre Corporation, McLean, VA (US)

( * ) Notice: Subject to any disclaimer, the term of this patent is extended or adjusted under 35 U.S.C. 154(b) by 510 days.

(21) Appl. No.: 13/232,759

(22) Filed: Sep. 14, 2011

(65) Prior Publication Data

US 2013/0063320 A1 Mar. 14, 2013

(51) Int. Cl.

| | |
|---|---|
| ***G01S 7/40*** | (2006.01) |
| ***H01Q 3/00*** | (2006.01) |
| ***H04B 7/10*** | (2006.01) |
| ***H01Q 19/06*** | (2006.01) |
| ***H01Q 1/42*** | (2006.01) |

(52) U.S. Cl.

USPC ........... 342/174; 342/165; 342/359; 342/361; 343/753; 343/754; 343/872

(58) Field of Classification Search

CPC ......... H01Q 1/42; H01Q 15/02; H01Q 1/421; H01Q 19/06; H01Q 15/24; H01Q 3/00; G01S 3/48; G01S 7/032; G01S 7/2813; G01S 7/4813

USPC .......... 342/165–174, 359, 361–377; 343/753, 343/754, 757, 872

See application file for complete search history.

(56) References Cited

U.S. PATENT DOCUMENTS

| | | | | |
|---|---|---|---|---|
| 3,936,736 | A * | 2/1976 | Ray | 324/642 |
| 3,940,767 | A * | 2/1976 | DeLano et al. | 342/63 |
| 4,097,796 | A * | 6/1978 | Lunden | 324/642 |
| 4,303,211 | A * | 12/1981 | Dooley et al. | 244/3.19 |
| 4,486,756 | A * | 12/1984 | Peregrim et al. | 342/149 |
| 5,066,921 | A * | 11/1991 | Rope et al. | 324/639 |
| 5,371,505 | A * | 12/1994 | Michaels | 342/360 |
| 5,384,458 | A * | 1/1995 | Hilliard et al. | 250/227.17 |
| 5,457,464 | A * | 10/1995 | Scott et al. | 342/352 |
| 5,689,276 | A * | 11/1997 | Uematsu et al. | 343/872 |
| 6,686,872 | B2 * | 2/2004 | Vacanti | 342/173 |
| 6,853,330 | B1 * | 2/2005 | Krikorian et al. | 342/149 |
| 6,937,186 | B1 * | 8/2005 | Dybdal et al. | 342/173 |
| 6,946,990 | B2 * | 9/2005 | Monk | 342/174 |
| 6,958,725 | B1 * | 10/2005 | Price et al. | 342/173 |
| 7,126,525 | B2 * | 10/2006 | Suzuki et al. | 342/70 |
| 7,705,771 | B2 * | 4/2010 | Kato et al. | 342/70 |
| 7,852,258 | B2 * | 12/2010 | Kato et al. | 342/82 |
| RE42,472 | E * | 6/2011 | Dybdal et al. | 342/173 |
| 2003/0071753 | A1 * | 4/2003 | Vacanti | 342/173 |
| 2004/0227663 | A1 * | 11/2004 | Suzuki et al. | 342/70 |
| 2005/0017897 | A1 * | 1/2005 | Monk | 342/174 |
| 2005/0024261 | A1 * | 2/2005 | Fujita | 342/174 |
| 2006/0202909 | A1 * | 9/2006 | Nagai | 343/911 R |
| 2009/0102700 | A1 * | 4/2009 | Kato et al. | 342/173 |
| 2009/0140912 | A1 * | 6/2009 | Kato et al. | 342/70 |

* cited by examiner

*Primary Examiner* — Peter Bythrow
(74) *Attorney, Agent, or Firm* — Proskauer Rose LLP

(57) ABSTRACT

A method of optimizing an antenna system can include determining a desired angle to rotate an antenna based on an axial ratio of electromagnetic waves exiting a radome that surrounds the antenna. The desired angle can be determined by a computing device based on a set of axial ratio values.

11 Claims, 4 Drawing Sheets

TERMINAL AXIAL RATIO OPTIMIZATION

FIELD OF THE INVENTION

The present invention relates to an antenna radiating through a radome.

BACKGROUND

Communication systems that include antennas can be deployed in a variety of ways. For example, atop cars, trucks, trains, recreational vehicles (RVs), boats, military vehicles, commercial aircraft, unmanned aerial vehicles, as part of satellites, or networks. Many communication systems have antennas that are enclosed within a radome.

While radomes are intended to antenna systems, they can also contribute to electromagnetic wave (i.e., electromagnetic radiation) distortion due physical properties of the radome when electromagnetic waves radiate from the antenna through the radome. For example, an electromagnetic wave having a circular polarization can be distorted to an elliptical polarization upon transmission through the radome. In addition, the antenna itself can emit electromagnetic waves of a polarization that differs from the desired polarization, due to, for example, imperfections in the antenna's design and/or construction. Upon transmission through the radome, a further distortion of the electromagnetic waves can occur.

One solution to the distortion is to design the shape of the radome so that distortion does not occur. For communication systems that require a radome having a particular shape, distortion is typically not practically correctable by reshaping the radome. For example, communication systems aboard aircraft typically require the radome to be shaped to maintain the aerodynamic stability of the aircraft.

Therefore, it is desirable to minimize electromagnetic signal distortion due to transmission through a radome without modifying the shape of the radome.

SUMMARY OF THE INVENTION

In one aspect, the invention features a method of optimizing an antenna system. The method involves receiving, by a computing device, one or more tilt angle values each corresponding to a tilt angle of electromagnetic waves transmitted from the antenna and incident on a radome surrounding the antenna. The method also involves receiving, by the computing device, one or more incident angle values each corresponding to an angle that the electromagnetic waves transmitted from the antenna are incident upon the radome. The method also involves determining, by the computing device, one or more tilt angle incident angle pairs by uniquely combining the one or more tilt angle values and the one or more incident angle values. The method also involves determining, by the computing device, a set of axial ratio values that has one axial ratio value for each of the one or more tilt angle incident angle pairs based on one or more physical characteristics of the radome, wherein the set of axial ratios are for electromagnetic waves after exiting the radome. The method also involves determining, by the computing device, a desired angle to rotate the antenna based on the set of axial ratio values.

In some embodiments, determining the set of axial ratio values involves determining, by the computing device, an antenna polarization state for each of the tilt angle values in the one or more tilt angle incident angle pairs, determining, by the computing device, perpendicular and parallel transmission coefficients of the radome for each of the incident angle values in the one or more tilt angle incident angle pairs, and determining, by the computing device, the set of axial ratio values based on the antenna polarization states and the perpendicular and parallel transmission coefficients.

In some embodiments, determining the desired angle involves setting the desired angle to a tilt angle value from the one or more tilt angle incident angle pairs that corresponds to the lowest axial ratio value from the set of axial ratio values.

In some embodiments, wherein determining the desired angle involves determining an average axial ratio for each of the one or more tilt angles based on the set of axial ratio values and setting the desired angle to the tilt angle from the one or more tilt angles that has the lowest average axial ratio value.

In some embodiments, determining the desired angle involves determining for each of the one or more incident angle values a weight, wherein the weight is based on a total number of electromagnetic waves incident upon the radome and a number of electromagnetic waves incident upon the radome for each of the one or more incident angle values and weighting each of the axial ratio values in the set of axial ratio values by the weight that corresponds to the incident angle value of the axial ratio value, determining a single axial ratio for each of the one or more tilt angles by integrating the weighted axial ratio values for each of the one or more tilt angles, and setting the desired angle to the one or more tilt angle that has the lowest single axial ratio value.

In some embodiments, the method involves rotating the antenna based on the desired angle such that a first axial ratio imposed upon the electromagnetic waves exiting the antenna and incident upon the radome combine with a second axial ratio imposed upon the electromagnetic waves exiting the radome in a manner of canceling at least a portion of an overall axial ratio on the electromagnetic waves exiting the radome. In some embodiments, the determining the set of axial ratio values is further based on a frequency of the electromagnetic waves transmitted from the antenna.

In some embodiments, the antenna transmits circularly polarized electromagnetic waves. In some embodiments, the antenna is rotated about a center axis by the desired angle. In some embodiments, the antenna transmits electromagnetic waves having a frequency between 29 GHz and 31 GHz.

In another aspect, the invention includes an antenna optimization system. The antenna optimization system includes means for receiving one or more tilt angle values each corresponding to a tilt angle of electromagnetic waves transmitted from the antenna and incident on a radome surrounding the antenna and means for receiving one or more incident angle values each corresponding to an angle that the electromagnetic waves transmitted from the antenna are incident upon the radome. The antenna optimization system also includes means for determining one or more tilt angle incident angle pairs by uniquely combining the one or more tilt angle values and the one or more incident angle values. The antenna optimization system also includes means for determining a set of axial ratio values for each of the one or more tilt angle incident angle pairs based on one or more physical characteristics of the radome, wherein the set of axial ratios are for electromagnetic waves after exiting the radome and means for determining a desired angle to rotate the antenna based on the set of axial ratio values.

Advantages of the invention include a reduction in axial ratio of electromagnetic waves exiting a radome. Another advantage of the invention is satellites (or any receiving terminal) that receives the electromagnetic waves exiting the radome can certify the electromagnetic waves exiting the radome because of the reduction in axial ratio. The reduction is axial ratio can also reduce the interference that would have otherwise been introduced by an uncompensated antenna/radome combination. In a satellite system, reducing the axial ratio can increase throughput. The axial ratio can be reduced without changing the physical design of the radome physical, thus existing systems can experience a reduction in the axial ratio.

BRIEF DESCRIPTION OF THE DRAWINGS

The foregoing features of the invention will be more readily understood by reference to the following detailed description, taken with reference to the accompanying drawings.

DETAILED DESCRIPTION OF ILLUSTRATIVE EMBODIMENTS

Figure 1B:
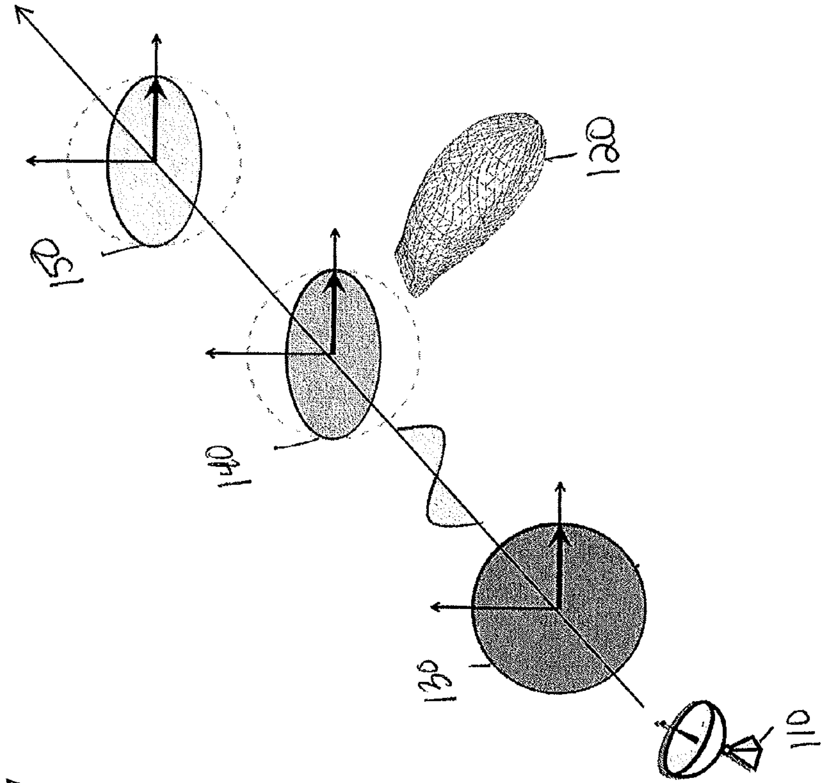
FIG. 1B shows electromagnetic waves transmitted from the antenna through the radome with distortion of the electromagnetic waves caused by the radome.

Communication systems can include an antenna surrounded by a radome. The antenna can emit electromagnetic waves (i.e., rays, signals, and/or radiation) that are transmitted through the radome. The antenna can emit electromagnetic waves that are circularly polarized. One of ordinary skill understands that polarization of circularly polarized electromagnetic waves can be described by an axial ratio and a tilt angle. An axial ratio is the ratio of the magnitude of the major and minor axis defined by an electric field vector of the electromagnetic waves. A tilt angle is an angle of rotation of the electromagnetic waves with a frame of reference defined by the antenna.

An electromagnetic wave having an axial ratio of one (i.e., zero dB) is perfectly circularly polarized. An electromagnetic wave having an axial ratio of infinity is perfectly linearly polarized. An electromagnetic wave having a finite non-one axial ratio is elliptically polarized (e.g., distorted). One of ordinary skill understands that many variables affect the axial ratio of electromagnetic waves. For example, physical properties of a radome such as shape and material composition affect the axial ratio of electromagnetic waves that are transmitted through the radome. In another example, an angle that electromagnetic waves are incident upon the radome affects the axial ratio. One of ordinary skill understands that an antenna typically transmits electromagnetic waves with a radiation pattern, such that a percentage of the electromagnetic waves are incident upon a radome with one angle, another percentage of the electromagnetic waves are incident upon a radome with another angle, and so forth.

In general, an antenna is rotated such that a distortion by the antenna of electromagnetic waves exiting the antenna is substantially cancelled when transmitted through a radome.

FIGS. 1A-1D are exemplary diagrams showing examples of various axial ratios and tilt angles that result from electromagnetic waves transmitted from an exemplary antenna 110 through an exemplary radome 120. In FIGS. 1A-1D, diagram 130 shows the axial ratio and tilt angle applied to the electromagnetic waves by the antenna 110, diagram 140 shows the axial ratio and the tilt angle applied to the electromagnetic waves by the radome 120, and diagram 150 shows the axial ratio and the tilt angle of the electromagnetic waves that results from transmission of the electromagnetic waves from the antenna 110 through the radome 120. The tilt angle is described with respect to frame of reference 105.

Figure 1A:
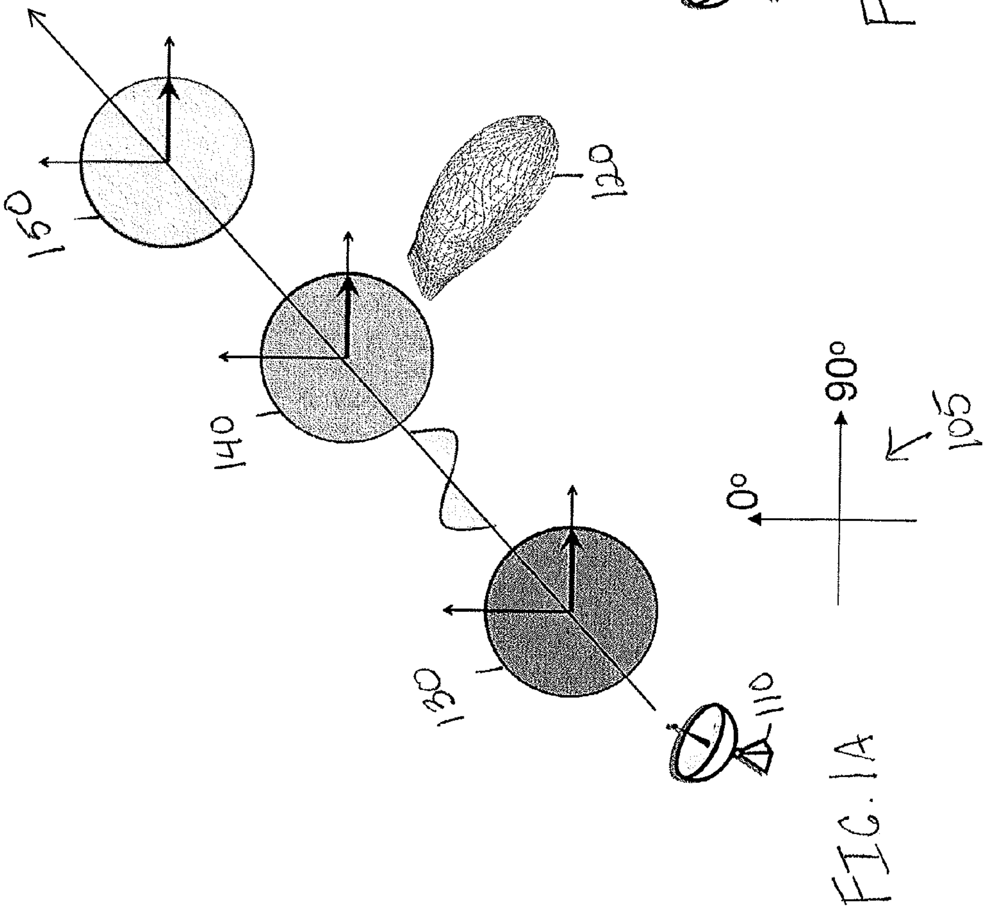
FIG. 1A shows electromagnetic waves transmitted from an antenna through a radome with no distortion of the electromagnetic waves caused by the antenna or the radome.

FIG. 1A shows electromagnetic waves transmitted from the antenna 110 through the radome 120 with no distortion of the electromagnetic waves by the antenna 110 or the radome 120. Specifically, diagram 130 shows an axial ratio of one and a tilt angle of 90° imparted upon the electromagnetic waves by the antenna 110. Diagram 140 shows an axial ratio of one and a tilt angle of 90° imparted upon the electromagnetic waves by the radome 120. Diagram 150 shows an axial ratio of one and tilt angle of 90° of the electromagnetic waves resulting from the transmission of the electromagnetic waves from the antenna 110 through the radome 120.

FIG. 1B shows electromagnetic waves transmitted from the antenna 110 through the radome 120 with distortion of the electromagnetic waves by the radome 120. Specifically, diagram 130 shows an axial ratio of one and a tilt angle of 90° imparted upon the electromagnetic waves by the antenna 110. Diagram 140 shows an axial ratio of two and a tilt angle of 90° imparted upon the electromagnetic waves by the radome 120. Diagram 150 shows an axial ratio of two and tilt angle of 90° of the electromagnetic waves resulting from the transmission of the electromagnetic waves from the antenna 110 through the radome 120.

Figure 1D:
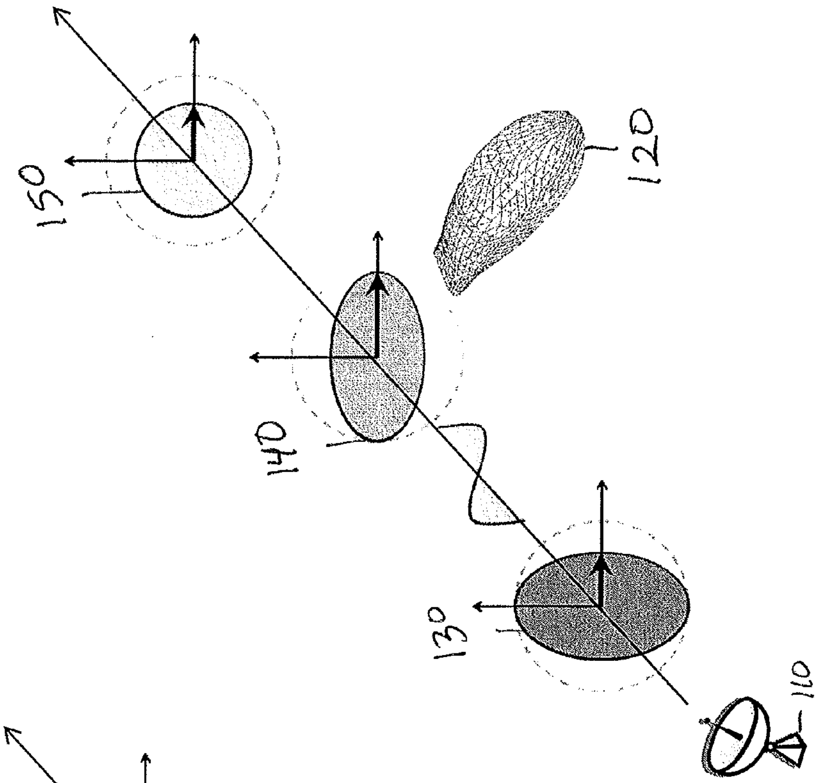
FIG. 1D shows electromagnetic waves transmitted from the antenna through the radome with correction of distortion of the electromagnetic waves caused by the antenna and the radome, according to an illustrative embodiment of the invention.
Figure 1C:
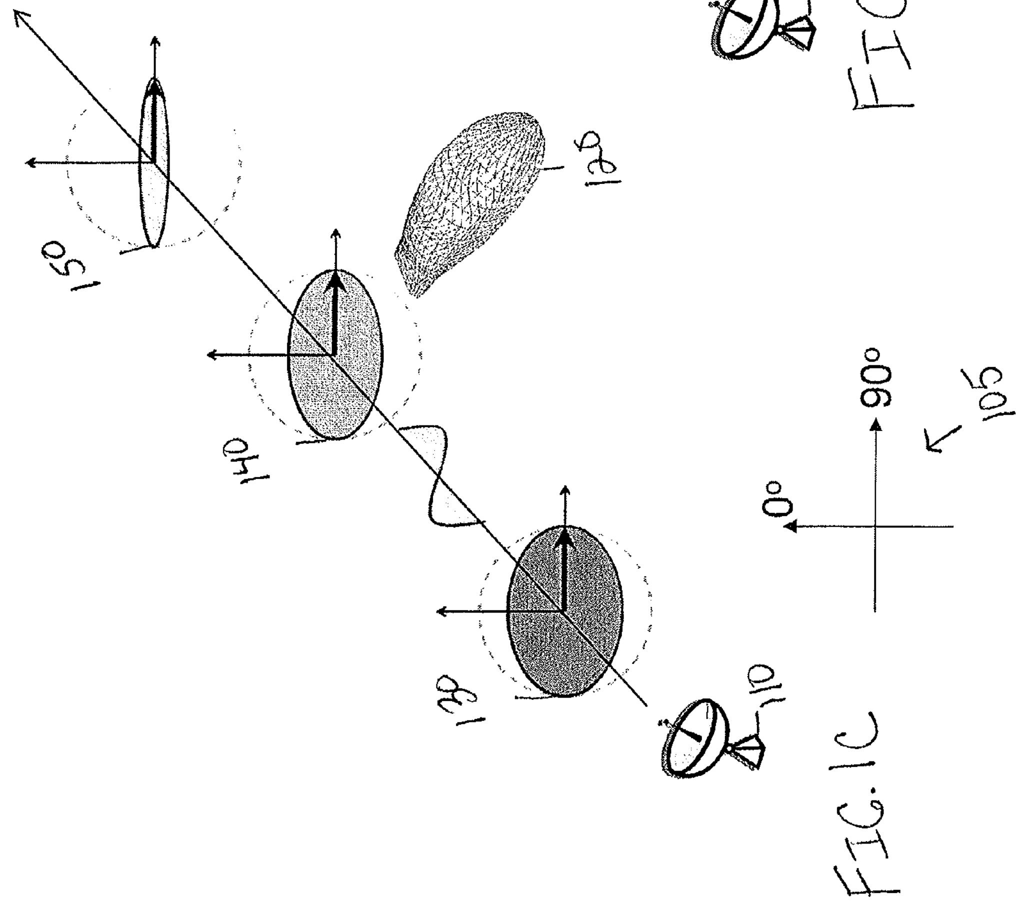
FIG. 1C shows electromagnetic waves transmitted from the antenna through the radome with distortion of the electromagnetic waves caused by the antenna and the radome.

FIG. 1C shows electromagnetic waves transmitted from the antenna 110 through the radome 120 with distortion of the electromagnetic waves by the antenna 110 and the radome 120. Specifically, diagram 130 shows an axial ratio of two and a tilt angle of 90° is imparted upon the electromagnetic waves by the antenna 110. Diagram 140 shows an axial ratio of two and a tilt angle of 90° is imparted upon the electromagnetic waves by the radome 120. Diagram 150 shows an axial ratio of four and tilt angle of 90° of the electromagnetic waves resulting from the transmission of the electromagnetic waves from the antenna 110 through the radome 120.

FIG. 1D shows electromagnetic waves transmitted from the antenna 110 through the radome 120 with correction of distortion of the electromagnetic waves caused by the antenna 110 and the radome 120, according to an illustrative embodiment of the invention. Specifically, diagram 130 shows that upon rotation of antenna 110 by a desired angle, an axial ratio of two and a tilt angle of 180° is imparted upon the electromagnetic waves by the antenna 110. Diagram 140 shows an axial ratio of two and a tilt angle of 90° is imparted upon the electromagnetic waves by the radome 120. Diagram 150 shows an axial ratio of one and tilt angle of 90° of the electromagnetic waves resulting from the transmission of the electromagnetic waves from the antenna 110 through the radome 120. Thus, by rotating the antenna 110 by the desired angle, the distortion by the antenna 110 and the distortion by the radome 120 substantially cancel. One of skill in the art understands that the axial ratio values and the tilt angle values presented here are for exemplary purposes only and that axial ratios vary based on antenna geometry, antenna type, antenna look angle, transmission frequency, radome geometry, radome type, radome materials, incident angle of electromagnetic radiation on the radome, and other parameters known in the art.

Figure 2:
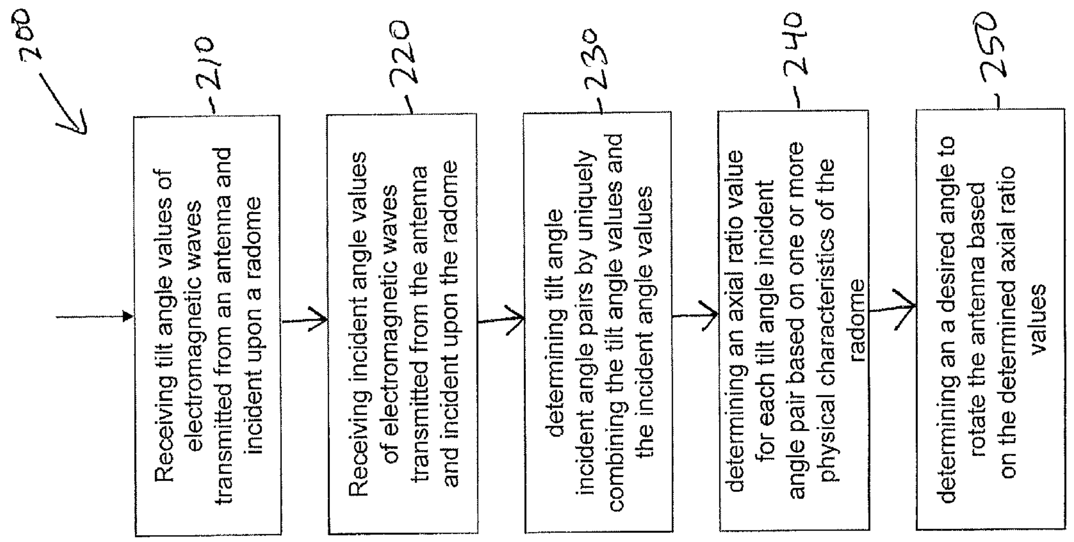
FIG. 2 is a flow diagram showing a method of optimizing an antenna, according to an illustrative embodiment of the invention.

FIG. 2 is a flow diagram 200 showing a method of optimizing an antenna, according to an illustrative embodiment of the invention. The method includes receiving one or more tilt angle values that correspond to a tilt angle of electromagnetic waves transmitted from an antenna and incident upon a radome (Step 210). The tilt angle values can be expressed in degrees and can range from 0 to 360. The tilt angle values can be expressed in radians and can range from 0 to π.

The method also involves receiving one or more incident angle values that correspond to angles that the electromagnetic waves are incident on the radome (Step 220).

The method also involves determining tilt angle incident angle pairs by uniquely combining the tilt angle values and the incident angle values (Step 230).

The method also involves determining a set of axial ratio values, one for each tilt angle incident angle pair based on one or more characteristics of the radome (Step 240). In some embodiments, determining the set of axial ratio value involves 1) determining an antenna polarization state for each of the tilt angles of the tilt angle incident angle pairs, 2) determining perpendicular and parallel transmission coefficients of the radome for each incident angle of the tilt angle incident angle pairs, and 3) determining the set of axial ratios based on the antenna polarization state and the perpendicular and parallel transmission coefficients.

In some embodiments, the determining the antenna polarization state involves determining an initial axial ratio ($AR^i$) of electromagnetic waves exiting the antenna, an initial gamma ($\gamma^i$) which is the relative magnitude of polarization components of the electromagnetic wave and a par of (gamma, delta) set of angles that describe the polarization state, and an initial delta ($\delta^i$) which is the phase angle by which the perpendicular component of the electromagnetic waves exiting the antenna leads the parallel component of the electromagnetic fields exiting the antenna, for each tilt angle of the tilt angle incident angle pairs. In some embodiments, the initial axial ratio- is determined by:

$$AR^i = 10^{\frac{AR^i_{dB}}{20}} \qquad \text{EQN. 1}$$

where $AR_{dB}{}^i$ is the axial ratio of the antenna. In some embodiments, the initial gamma ($\gamma^i$) and an initial delta ($\delta^i$) are determined by:

$$\gamma^i = \frac{1}{2}\cos^{-1}[\cos(2\varepsilon^i)\cdot\cos(2\tau^i)] \qquad \text{EQN. 2}$$

$$\delta^i = \sin^{-1}\left[\frac{\sin(2\varepsilon^i)}{\sin(2\gamma^i)}\right] \qquad \text{EQN. 3}$$

where $\tau^i$ is a tilt angle value of the antenna (e.g., tilt of the polarization ellipse of the antenna) and $\in^i$ is can be determined by:

$$\in^i = \cot^{-1}(AR^i) \qquad \text{EQN. 4}$$

In some embodiments, the perpendicular ($T_\perp$) and parallel transmission ($T_\parallel$) coefficients of the radome for each incident angle of the tilt angle incident angle pairs are determined by:

$$T_\perp = \frac{E^t_\perp}{E^i_\perp} = \frac{B_0}{A_0} \qquad \text{EQN. 5}$$

$$T_\parallel = \frac{E^t_\parallel}{E^i_\parallel} = \frac{1}{C_0} \qquad \text{EQN. 6}$$

where $E_\perp{}^i$ is a perpendicular electric field of the electromagnetic waves incident on the radome by the antenna, $E_\perp{}^t$ is a perpendicular electric field of the electromagnetic waves transmitted from the radome, $E_\parallel{}^i$ is a parallel electric field of the electromagnetic waves incident on the radome by the antenna, and $E_\parallel{}^t$ is a parallel electric field of the electromagnetic waves transmitted from the radome. The perpendicular and parallel electric fields incident on the radome by the antenna and transmitted from the radome can be determined as follows:

$$A_j = \frac{e^{\Psi_1}}{2}[A_{j+1}(1+Y_{j+1}) + B_{j+1}(1-Y_{j+1})] \qquad \text{EQN. 7}$$

$$B_j = \frac{e^{-\Psi_1}}{2}[A_{j+1}(1-Y_{j+1}) + B_{j+1}(1+Y_{j+1})] \qquad \text{EQN. 8}$$

$$C_j = \frac{e^{\Psi_1}}{2}[C_{j+1}(1+Z_{j+1}) + D_{j+1}(1-Z_{j+1})] \qquad \text{EQN. 9}$$

$$D_j = \frac{e^{-\Psi_1}}{2}[C_{j+1}(1-Z_{j+1}) + D_{j+1}(1+Z_{j+1})] \qquad \text{EQN. 10}$$

where $$A_{N+1} = C_{N+1} = 1 \qquad \text{EQN. 11}$$

$$B_{N+1} = D_{N+1} = 0 \qquad \text{EQN. 12}$$

$$Y_{j+1} = \frac{\cos(\theta_{j+1})}{\cos(\theta_j)}\sqrt{\frac{\varepsilon_{j+1}[1 - j\tan(\delta_{j+1})]}{\varepsilon_j[1 - j\tan(\delta_j)]}} \qquad \text{EQN. 14}$$

$$Z_{j+1} = \frac{\cos(\theta_{j+1})}{\cos(\theta_j)}\sqrt{\frac{\varepsilon_j[1 - j\tan(\delta_j)]}{\varepsilon_{j+1}[1 - j\tan(\delta_{j+1})]}} \qquad \text{EQN. 15}$$

$$\psi_j = \delta_j\gamma_j\cos(\theta_j) \qquad \text{EQN. 16}$$

$$\gamma_j = \pm\sqrt{j\omega\mu_j(\sigma_j + j\omega\varepsilon_j)} \qquad \text{EQN. 17}$$

where j is an index to denote quantities related to a jth layer of the radome, N is the number of radome layers, $\sigma_j$ is the loss tangent of the jth layer of the radome, and $\in_j$ is the dielectric constant of the jth layer of the radome, $\theta_j$ is a complex angle of refraction in the jth layer of the radome and the angle of incidence for the (j+1)th layer of the radome, ($\gamma_j$, $\delta_j$) are a set of angles which can describe a point on the surface of a Poincare sphere. As is easily understood by one of ordinary skill, ($\gamma_j$, $\delta_j$) are typically used to represent a polarization state of an electromagnetic wave, where γ is half of the great-circle angle drawn from a reference point on the equator to P, and δ is an angle from the equator to the great-circle angle.

In some embodiments, the set of axial ratios is determined based on a transmitted gamma ($\gamma^t$) which is the relative magnitude of polarization components of the transmitted electromagnetic waves, and a transmitted delta ($\delta^t$) which is the phase angle by which the perpendicular component of the electromagnetic waves exiting the radome leads the parallel component of the electromagnetic fields exiting the radome, for each incident angle of the tilt angle incident angle pairs, and a transmitted axial ratio ($AR^i$) of electromagnetic waves exiting the antenna, for each tilt angle of the tilt angle incident angle pairs. In some embodiments, the transmitted gamma ($\gamma^t$) and the transmitted delta ($\delta^t$) are determined by:

$$\gamma^t = \tan^{-1}\left[\frac{|T_\perp|}{|T_{||}|}\tan\gamma^i\right] \quad \text{EQN. 18}$$

$$\delta^t = \delta^i + (\xi^t_\perp - \xi^t_{||}) \quad \text{EQN. 19}$$

where $T_\perp$ and $T_{||}$ are the perpendicular and parallel transmission coefficients of the radome for each incident angle of the tilt angle incident angle pairs, and $\gamma^i$ is the initial gamma as determined above in EQN. 2, $\delta^i$ is a initial delta as determined above in EQN. 4, $\xi_\perp{}^t$ is a perpendicular component of the phase of the electromagnetic waves transmitted from the radome, and $\xi_{||}{}^t$ is a parallel component of the phase of the electromagnetic waves transmitted from the radome. In some embodiments, $T_\perp$ and $T_{||}$ are determined as follows:

$$T_\perp = |T_\perp| e^{j\xi_\perp{}^t} \quad \text{EQN. 20}$$

$$T_{||} = |T_{||}| e^{j\xi_{||}{}^t} \quad \text{EQN. 21}$$

In some embodiments, the transmitted axial ratio ($AR_{dB}{}^t$) is determined by:

$$AR_{dB}{}^t = 20\log_{10}(AR^t) \quad \text{EQN. 22}$$

where $AR^t$ is determined by:

$$AR^t = \cot(\in^t) \quad \text{EQN. 23}$$

where $\in^t$ is a cotangent of the axial ratio and a part of (epsilon, tau) set of angles that describe the polarization state of the wave and is determined by:

$$\sin(2\in^t) = \sin(2\gamma^t)\sin(\delta^t) \quad \text{EQN. 24}$$

In some embodiments, determining the desired angle involves setting the desired angle to the tilt angle that corresponds to the tilt angle incident angle pair having the lowest axial ratio ($AR_{dB}{}^t$).

In some embodiments, determining the desired angle involves 1) determining a weight for each of the one or more incident angle values; 2) weighting each axial ratio value corresponding to an tilt angle incident angle pair having a particular incident angle value by the weight that was determined for that particular incident angle value; 3) for each tilt angle value determining a single axial ratio by integrating the weighted axial ratio values that corresponds to a tilt angle incident angle pair having the particular tilt angle value; and 4) setting the desired angle to the tilt angle value that has the lowest single axial ratio.

In some embodiments, determining a weight for each of the one or more incident angle values involves 1) determining an angular distribution for the electromagnetic waves that are incident upon the radome; 2) determining, for each of the angles in the angular distribution, a percentage of electromagnetic waves that are incident upon the radome from the total number electromagnetic waves incident upon the radome; and 3) assigning a weight to each incident angle based on the percentages.

Figure 3B:
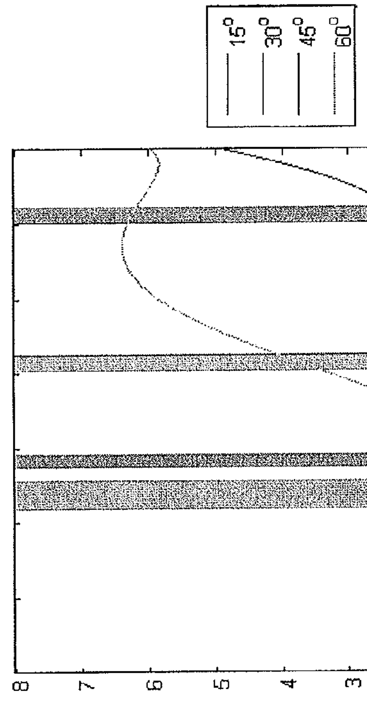
FIG. 3B is a graph showing axial ratio vs. frequency for multiple radome incident angles.
Figure 3A:
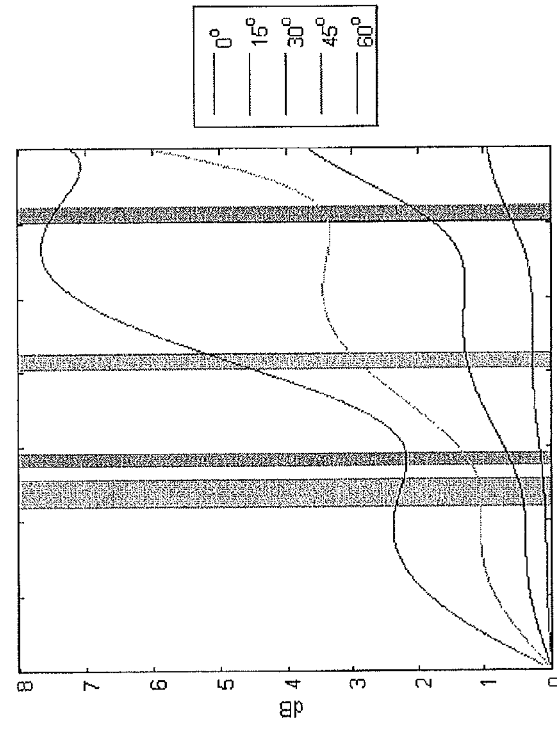
FIG. 3A is a graph showing axial ratio vs. frequency for multiple radome incident angles.

FIG. 3A is a graph showing axial ratio vs. frequency for multiple radome incident angles before rotating the antenna by the desired angle. FIG. 3B shows the axial ratio is a graph showing axial ratio vs. frequency for multiple radome incident angles before rotating the antenna by the desired angle. FIG. 3B shows an approximate 2 dB improvement in axial ratio by rotating the antenna by the desired angle.

In various embodiments, the disclosed methods may be implemented as a computer program product for use with an antenna system and/or a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems.

Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

One skilled in the art can appreciate that the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method of optimizing an antenna system, comprising:

receiving, by a computing device, one or more tilt angle values each corresponding to a tilt angle of electromagnetic waves transmitted from the antenna and incident on a radome surrounding the antenna;

receiving, by the computing device, one or more incident angle values each corresponding to an angle that the electromagnetic waves transmitted from the antenna are incident upon the radome;

determining, by the computing device, one or more tilt angle incident angle pairs by uniquely combining the one or more tilt angle values and the one or more incident angle values;

determining, by the computing device, a set of axial ratio values that has one axial ratio value for each of the one or more tilt angle incident angle pairs based on one or more physical characteristics of the radome, wherein the set of axial ratios are for electromagnetic waves after exiting the radome; and determining, by the computing device, a desired angle to rotate the antenna based on the set of axial ratio values.

2. The method of claim 1, wherein determining the set of axial ratio values further comprises:

determining, by the computing device, an antenna polarization state for each of the tilt angle values in the one or more tilt angle incident angle pairs;

determining, by the computing device, perpendicular and parallel transmission coefficients of the radome for each of the incident angle values in the one or more tilt angle incident angle pairs; and determining, by the computing device, the set of axial ratio values based on the antenna polarization states and the perpendicular and parallel transmission coefficients.

3. The method of claim 2, wherein determining the desired angle further comprises setting the desired angle to a tilt angle value from the one or more tilt angle incident angle pairs that corresponds to the lowest axial ratio value from the set of axial ratio values.

4. The method of claim 2, wherein determining the desired angle further comprises:

determining an average axial ratio for each of the one or more tilt angles based on the set of axial ratio values; and setting the desired angle to the tilt angle from the one or more tilt angles that has the lowest average axial ratio value.

5. The method of claim 2, wherein determining the desired angle further comprises:

determining for each of the one or more incident angle values a weight, wherein the weight is based on a total number of electromagnetic waves incident upon the radome and a number of electromagnetic waves incident upon the radome for each of the one or more incident angle values;

weighting each of the axial ratio values in the set of axial ratio values by the weight that corresponds to the incident angle value of the axial ratio value;

determining a single axial ratio for each of the one or more tilt angles by integrating the weighted axial ratio values for each of the one or more tilt angles; and setting the desired angle to the one or more tilt angle that has the lowest single axial ratio value.

6. The method of claim 1, further comprising rotating the antenna based on the desired angle such that a first axial ratio imposed upon the electromagnetic waves exiting the antenna and incident upon the radome combine with a second axial ratio imposed upon the electromagnetic waves exiting the radome in a manner of cancelling at least a portion of an overall axial ratio on the electromagnetic waves exiting the radome.

7. The method of claim 1, wherein determining the set of axial ratio values is further based on a frequency of the electromagnetic waves transmitted from the antenna.

8. The method of claim 1, wherein the antenna transmits circularly polarized electromagnetic waves.

9. The method of claim 1, wherein the antenna is rotated about a center axis by the desired angle.

10. The method of claim 1, wherein the antenna transmits electromagnetic waves having a frequency between 29 GHz and 31 GHz.

11. An antenna optimization system, comprising:

means for receiving one or more tilt angle values each corresponding to a tilt angle of electromagnetic waves transmitted from the antenna and incident on a radome surrounding the antenna;

means for receiving one or more incident angle values each corresponding to an angle that the electromagnetic waves transmitted from the antenna are incident upon the radome;

means for determining one or more tilt angle incident angle pairs by uniquely combining the one or more tilt angle values and the one or more incident angle values;

means for determining a set of axial ratio values for each of the one or more tilt angle incident angle pairs based on one or more physical characteristics of the radome, wherein the set of axial ratios are for electromagnetic waves after exiting the radome; and means for determining a desired angle to rotate the antenna based on the set of axial ratio values.

* * * * *